United States Patent
Schroeder et al.

(10) Patent No.: US 6,992,480 B2
(45) Date of Patent: Jan. 31, 2006

(54) COMBINED INCREMENTAL AND LINEAR MAGNETIC SENSOR

(75) Inventors: Thaddeus Schroeder, Rochester Hills, MI (US); Bruno P. B. Lequesne, Troy, MI (US); Avoki M. Omekanda, Rochester, MI (US); Thomas Wolfgang Nehl, Shelby Township, MI (US); Rassem Ragheb Henry, Clinton Township, MI (US)

(73) Assignee: Delphi Technologies, Inc., Troy, MI (US)

( * ) Notice: Subject to any disclaimer, the term of this patent is extended or adjusted under 35 U.S.C. 154(b) by 161 days.

(21) Appl. No.: 10/682,474

(22) Filed: Oct. 9, 2003

(65) Prior Publication Data

US 2005/0077894 A1    Apr. 14, 2005

(51) Int. Cl.
*G01B 7/14* (2006.01)

(52) U.S. Cl. ............................. 324/207.22; 324/207.25

(58) Field of Classification Search ........... 324/207.22, 324/207.21, 207.2, 207.25, 207.13, 207.12, 324/173, 174
See application file for complete search history.

(56) References Cited

U.S. PATENT DOCUMENTS

| | | | |
|---|---|---|---|
| 4,835,467 A | 5/1989 | Gokhale | 324/166 |
| 4,926,122 A | 5/1990 | Schroeder et al. | 324/207.13 |
| 4,939,456 A | 7/1990 | Morelli et a.l | 324/207.21 |
| 6,486,657 B2 * | 11/2002 | Schroeder | 324/207.21 |
| 6,577,123 B2 * | 6/2003 | Schroeder et al. | 324/207.24 |
| 6,894,486 B2 * | 5/2005 | Omekanda et al. | 324/207.22 |
| 2002/0180427 A1 | 12/2002 | Schroeder et al. | 324/207.24 |

* cited by examiner

*Primary Examiner*—Bot Ledynh
*Assistant Examiner*—Reena Aurora
(74) *Attorney, Agent, or Firm*—Jimmy L. Funke (57) ABSTRACT

A magnetic sensor provides an output voltage range having first and second linear slopes. Proper selection of magnetic sensor dimensions enables changes in magnetic flux density upon the passage of at least one tooth and one slot of a target wheel past the magnetic sensor to be represented as a linear magnetic sensor output comprised of at least one linear range whereby linear interpolation of position is possible with appropriate signal processing algorithms.

9 Claims, 6 Drawing Sheets

COMBINED INCREMENTAL AND LINEAR MAGNETIC SENSOR

TECHNICAL FIELD

The present invention relates to magnetosensitive or galvanomagnetic devices (e.g. Hall generators, magnetoresistors, etc.) for use as encoders to determine position.

BACKGROUND OF THE INVENTION

It is well known in the art that magnetic sensors can be employed in position and speed sensors with respect to moving ferromagnetic materials or objects (see for example U.S. Pat. Nos. 4,835,467, 4,926,122, and 4,939,456). In such applications, the magnetic sensor is biased with a magnetic field and electrically excited, typically, with a constant current source or a constant voltage source. A magnetic (i.e., ferromagnetic) object rotating relative, and in close proximity, to the magnetic sensor, such as a toothed wheel, produces a varying magnetic flux density through the magnetic sensor.

Figure 1A:
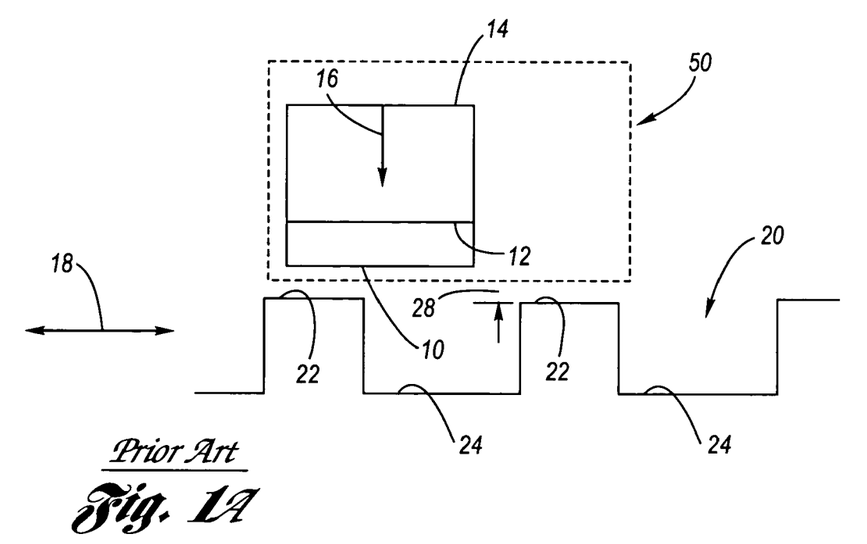
FIG. 1A is an example of a prior art magnetic sensor.

FIG. 1A is an example of a prior art magnetic sensor 50, wherein the magnetic sensor (MS) element 10 is mounted on the bottom surface 12 of a permanent magnet (bias magnet) 14 magnetized in a direction 16 perpendicular to the direction of motion 18 of target wheel 20 having teeth 22 and slots 24.

Figure 1B:
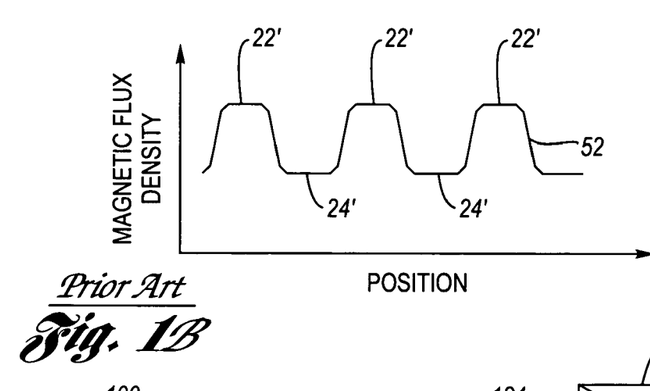
FIG. 1B is a plot of the detected magnetic flux density according to the prior art magnetic sensor of FIG. 1A.

FIG. 1B is a plot 52 of the magnetic flux density detected by the prior art magnetic sensor 50 of FIG. 1A as the target wheel 20 passes the magnetic sensor. The larger magnetic flux density 22' represents the passage of a tooth 22 past the sensor 50, whereas the smaller magnetic flux density 24' represents the passage of a slot 24 past the sensor.

The resolution of magnetic sensor 50 is related to the number of teeth 22 of target wheel 20. Increased resolution is achieved in a prior art magnetic sensor in one of three ways. One possible way consists of increasing the number of teeth 22. This approach is limited at some point, because the teeth 22 and slots 24 must be of a sufficient physical size to affect the magnetic field in the MS element 10, and, in some applications, the number of teeth 22 is fixed by external constraints, for instance, when target wheel 20 is a gear used for both mechanical advantage and for position sensing. The number of teeth 22, in such a case, may not be sufficient to provide the desired resolution. Another way consists of placing several MS elements 10 on the magnet surface 12. This, however, adds cost. Yet another way consists of using a phase-lock loop (PLL). This approach, however, suffers from errors during accelerations and decelerations. Finally, some applications, for instance spark-plug firing control, could use very fine position information, possibly within plus or minus one-half degree in that example, yet correspondingly fine resolution sensors (360 pulses per revolution in that example) are generally too costly.

Accordingly, what is needed in the art is a more robust magnetic sensor design enabling the resolution of the magnetic sensor to be increased.

SUMMARY OF THE INVENTION

The present invention is a magnetic sensor utilizing magnetosensitive or galvanomagnetic devices, herein referred to as magnetically sensitive (MS) elements, and a method by which increased position resolution is provided without adding teeth or adding cost. This is achieved by the sensor signal output having at least one linear range upon the passage of at least one tooth and one slot of the target wheel (one tooth pitch) past the magnetic sensor whereby it is possible to linearly interpolate position with appropriate signal processing algorithms.

The magnetic sensor senses changes in the magnetic flux density as the target wheel moves relative to the magnet and outputs a linear signal representing changes in the magnetic flux density. Preferably, the magnetic sensor or MS element is a Hall effect sensor or device, a semiconductor magnetoresistor (SMR), a permalloy magnetoresistor (PMR), or a giant magnetoresistor (GMR). If a Hall sensor or a semiconductor magnetoresistor is used, it senses a component of the magnetic flux density that is normal to its surface. On the other hand, if a permalloy magnetoresistor or a giant magnetoresistor is used, it senses the component of magnetic flux density which is co-planar, or parallel, to its surface.

In a first preferred embodiment of the present invention, a magnetic sensor consists of an MS element located facingly adjacent a side, instead of the bottom, of a stationary permanent magnet adjacent to a magnetic target wheel wherein the permanent magnet is magnetized parallel to the direction of motion of the surface of a magnetic target wheel and the MS element senses the component of magnetic flux density parallel to the direction of motion of the surface of a magnetic target wheel. Proper selection of magnetic sensor dimensions enables changes in magnetic flux density upon the passage of at least one tooth and one slot of the target wheel (one tooth pitch) past the magnetic sensor to be represented as a linear magnetic sensor output comprised of at least one linear range whereby linear interpolation of position is possible with appropriate signal processing algorithms.

In a second preferred embodiment of the present invention, a magnetic sensor consists of an MS element located at the bottom of a stationary permanent magnet wherein the permanent magnet is magnetized perpendicular to the direction of motion of the surface of a magnetic target wheel and the MS element senses the component of magnetic flux density parallel to the direction of motion of the surface of a magnetic target wheel. Proper selection of magnetic sensor dimensions enables changes in magnetic flux density upon the passage of at least one tooth and one slot of the target wheel (one tooth pitch) past the magnetic sensor to be represented as a linear magnetic sensor output comprised of at least one linear range whereby linear interpolation of position is possible with appropriate signal processing algorithms.

Accordingly, it is an object of the present invention to provide a magnetic sensor having increased position resolution without adding teeth to the target or adding cost and complexity to the sensor.

This, and additional objects, features and advantages of the present invention will become clearer from the following specifications.

DESCRIPTION OF THE PREFERRED EMBODIMENT

Figure 2:
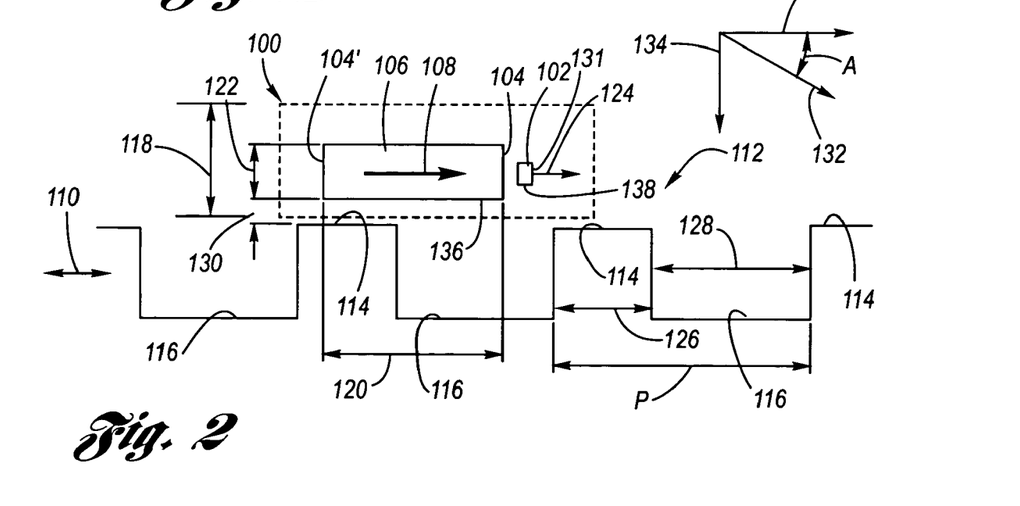
FIG. 2 depicts the first preferred embodiment of a magnetic sensor according to the present invention.

FIG. 2 depicts a first embodiment of a magnetic sensor 100 according to the present invention. The magnetic sensor 100 incorporates a magnetically sensitive (MS) element 102 located at a magnet side 104 or 104' (shown adjacent to side surface 104 in FIG. 2) of a permanent magnet (bias magnet) 106 magnetized in a direction 108 parallel to the direction of motion 110 of target wheel 112, the target wheel having teeth 114 and slots 116. The MS element 102 is sensitive to the component 124 (the detected magnetic flux density) of magnetic flux density 132 that is parallel to the direction of motion of the target wheel and parallel to the direction of magnetization of the permanent magnet, and wherein the component 136 of the magnetic flux density is perpendicular to component 124.

The location of the MS element 102 is facingly adjacent the permanent magnet side 104 or 104', rather than between the magnet 106 and target wheel 112, thereby decreasing the overall package thickness 118 compared to the aforedescribed prior art magnetic sensor 50, since the MS element 102, connecting wires, leadframe, bonding, and protective layers (not shown) are now removed from the overall thickness. The most preferred placement of the MS element 102 on the permanent magnet side 104 or 104' is nearest the lower edge 136 of permanent magnet 106, i.e., with the lower edge 138 of the MS element aligned with the lower edge the permanent magnet. Another advantage of the present invention is that the MS element 102 and its connections (not shown), which are the most fragile parts, are located away from the target wheel 112 resulting in a more robust design. Magnetic sensor 100 is also more amenable to electronic integration, in that the MS element 102 can more easily be connected or combined with electronic circuitry (not shown). The permanent magnet length 120 determines the magnetic field strength (magnetic flux density) 132 and, thus, the strength of magnetic field components 124, 134 whereas the permanent magnet width 122, by contrast, is not a significant design constraint for semiconductor sensor elements and can be reduced to obtain an overall very thin package. The permanent magnet width 122 is limited by the mechanical strength necessary for the application.

It is to be understood that the MS element 102 can be, for example, a Hall effect device, a semiconductor magnetoresistor (SMR), a permalloy magnetoresistor (PMR), or a giant magnetoresistor (GMR). For ease of discussion, the MS elements 102 can be divided into two types: type A elements and type B elements. Type A elements include Hall effect devices and SMRs. On the other hand, type B elements include PMRs and GMRs. It is to be appreciated that the type A elements are sensitive to the component of magnetic flux density, for example 124, that is perpendicular to their surfaces. On the other hand, type B elements are sensitive to the component of magnetic flux density, for example 134, that is parallel to their surfaces. A type A MS element 102 is depicted in FIG. 2 wherein the component of magnetic flux density 124 is perpendicular to the surface 131 of the MS element.

Figure 3:
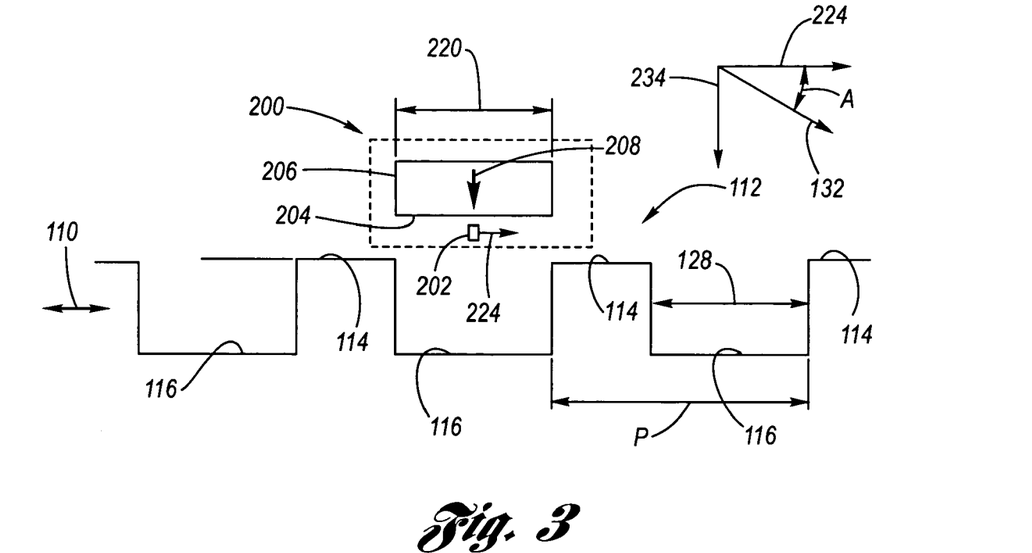
FIG. 3 depicts a second preferred embodiment of a magnetic sensor according to the present invention.

FIG. 3 depicts a second preferred embodiment of the present invention. The magnetic sensor 200 incorporates an MS element 202 mounted on the bottom surface 204 of a permanent magnet (bias magnet) 206 magnetized in a direction 208 perpendicular to the direction of motion 110 of target wheel 112 having teeth 114 and slots 116 wherein the MS element is sensitive to the component 224 (the detected magnetic flux density), of magnetic flux density 232, that is parallel to the direction of motion of the target wheel and perpendicular to the direction of magnetization of the permanent magnet, wherein the component 234 of the magnetic flux density 232 is perpendicular to component 224. The most preferred placement of the MS element 202 on bottom surface 204 of the permanent magnet 206 is at the center of permanent magnet length 220.

It is to be understood that the MS element 202 can be either a type A element or a type B element sensitive to the component of magnetic flux density 224. The changes in magnetic flux density component 224 detected by the MS element 202 are analogous to those of MS element 102 of FIG. 2.

Figure 4A:
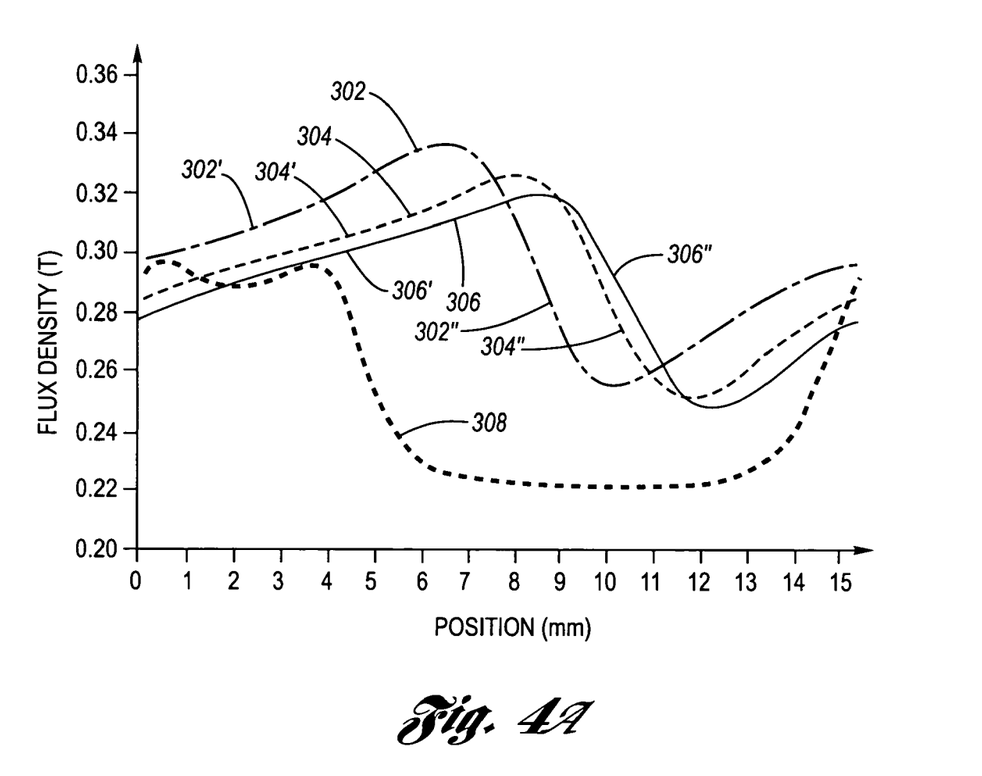
FIG. 4A is a first graph of detected magnetic flux densities according to the first embodiment of the present invention.

FIG. 4A is a first graph of detected magnetic flux densities according to the first embodiment of the present invention of plots 302, 304, 306 of magnetic flux densities 124 detected by MS element 102 for one tooth pitch P of 14.5 millimeters using finite element simulation for various permanent magnet lengths 120 of 13 mm, 10 mm, and 9 mm, respectively, wherein the MS element is, for example, a type A element. In FIG. 4A, the tooth width 126 is 1.5 mm and the slot width 128 is 13 mm whereby the tooth pitch P is 14.5 mm. Plot 308 is that of the prior art magnetic sensor 50 and is provided for comparative purposes. The permanent magnet length 120 determines the strength of the magnetic flux density 132 and, thus the strength of magnetic field components 124, 134. Each Plot 302, 304, and 306 consists of one gradual linear slope 302', 304', and 306' and one steep linear slope 302", 304", and 306" giving rise to a saw-tooth waveform shown pictorially in FIG. 4B having maximum and minimum voltage levels $V_{MAX}$ and $V_{MIN}$, wherein the tooth pitch P is the sum of the gradual linear slope $P'_1$ and the steep linear slope $P'_2$ where $P'_2$ has, approximately, a zero length.

Figure 4B:
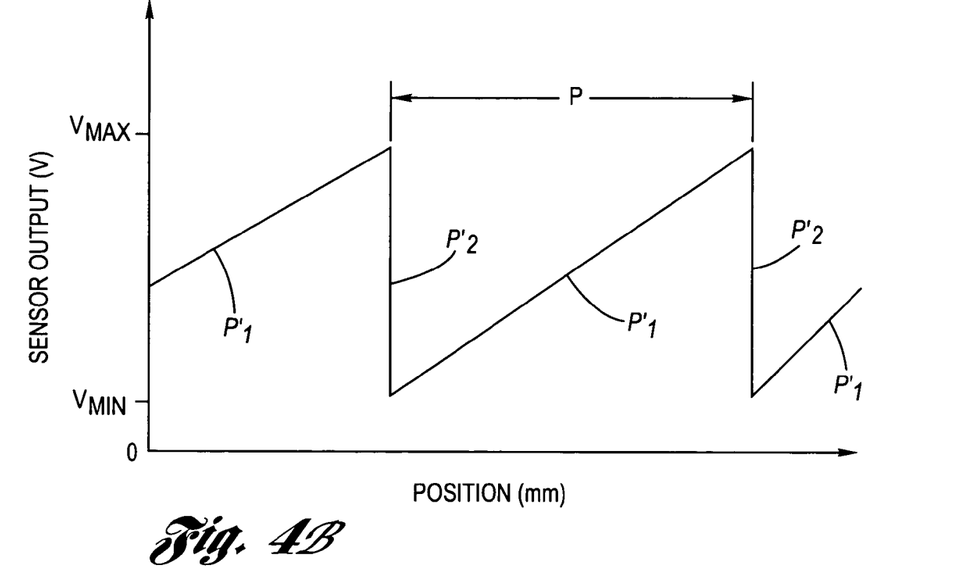
FIG. 4B is a representation of a saw-tooth waveform according to the first and second embodiments of the present invention.

Finite element simulation using the configuration of FIG. 3 yields analogous results of FIG. 4B for a tooth pitch P for the second embodiment of the present invention, wherein the tooth pitch is the sum of $P'_1$ and $P'_2$ where $P'_2$ has, approximately, zero length. The first and second embodiments of FIGS. 2 and 3, respectively, generate saw-tooth waveforms as depicted in FIGS. 4A and 4B provided that, preferably, tooth widths 114 are as narrow as feasible from a construction point of view, for example 1.5 mm for tooth pitch P of 14.5 mm, wherein permanent magnet lengths 120, 220 are, approximately, 70% to 100% of the slot width 116.

Figure 5A:
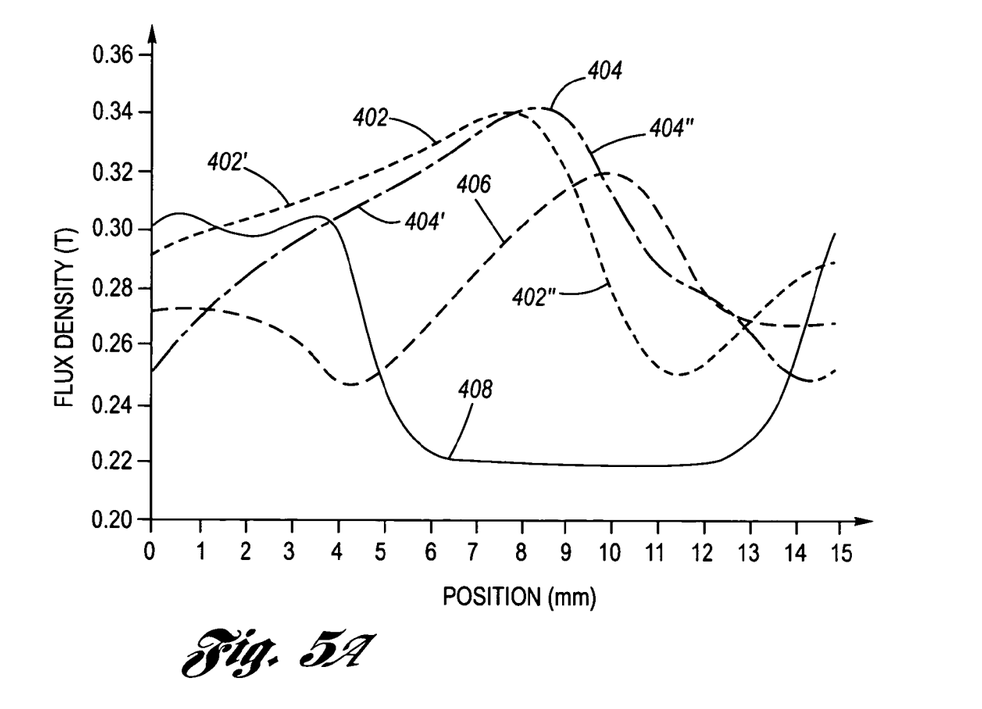
FIG. 5A is a second graph of detected magnetic flux densities according to the first embodiment of the present invention.

FIG. 5A is a second graph of detected magnetic flux densities according to the first preferred embodiment of the present invention of plots 402, 404, 406 of magnetic flux densities 124 detected by MS element 102 for one tooth pitch P of 14.5 millimeters using finite element simulation for various permanent magnet lengths 120 of 10 mm, 9 mm, and 6 mm, respectively, wherein the MS element is, for example, a type A element and the tooth widths 126 are 1.5 mm, 4 mm, and 7.25 mm, respectively. Plot 408 is that of the prior art magnetic sensor 50 and is provided for comparative purposes. The permanent magnet length 120 determines the strength of the magnetic flux density 132 and, thus the strength of magnetic field components 124, 134. Plots 402 and 404 each consist of two linear slopes 402', 404', 402", and 404" giving rise to a triangular waveform shown pictorially in FIG. 5B wherein the tooth pitch P is the sum of the linear slope $P_1$ and the linear slope $P_2$ where $P_1$ may not necessarily be symmetric to $P_2$.

Figure 5B:
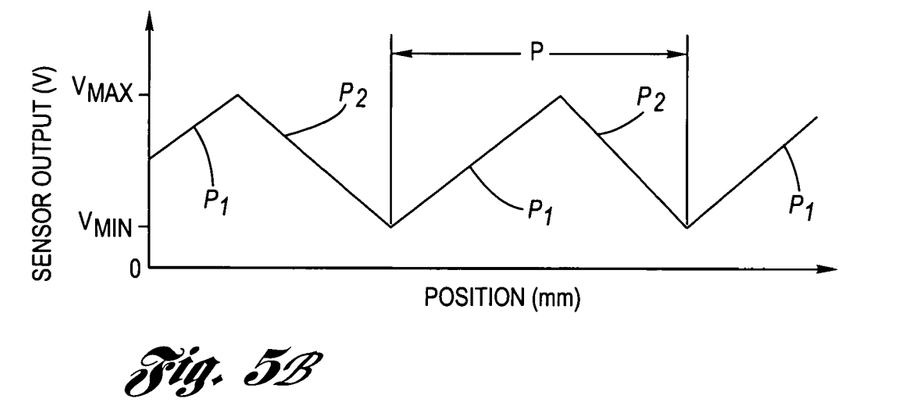
FIG. 5B is a representation of a triangular waveform according to the first and second embodiments of the present invention.

Finite element simulation using the configuration of FIG. 3 yields analogous results of FIG. 5B for a tooth pitch P for the second embodiment of the present invention, wherein the tooth pitch is the sum of $P_1$ and $P_2$ where $P_1$ may not necessarily be symmetric to $P_2$. The first and second embodiments of FIGS. 2 and 3, respectively, generate triangular waveforms as depicted in FIGS. 5A and 5B provided that, preferably, tooth widths 114 are, approximately, less than 40% of the tooth pitch P, wherein permanent magnet lengths 120, 220 are, approximately, 70% to 100% of the slot width 116.

Figure 6:
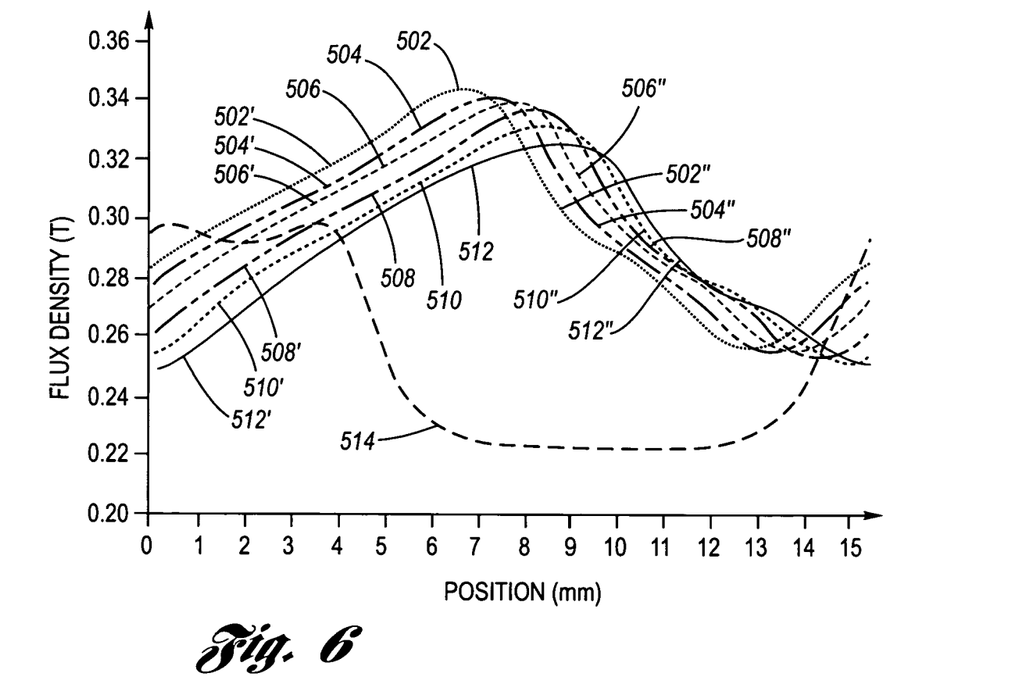
FIG. 6 is a third graph of detected magnetic flux densities according to the first embodiment of the present invention.

FIG. 6 is a third graph of detected magnetic flux densities according to the first embodiment of the present invention of plots 502 through 512 of magnetic flux densities 124 detected by MS element 102 for one tooth pitch P of 14.5 millimeters using finite element simulation for various permanent magnet lengths 120 of 13 mm, 12 mm, 11 mm, 10 mm, 9 mm, and 8 mm, respectively, wherein the MS element is, for example, a type A element and the tooth widths 126 are 4 mm. Plot 514 is that of the prior art magnetic sensor 50 and is provided for comparative purposes. The permanent magnet length 120 determines the strength of the magnetic flux density 132 and, thus the strength of magnetic field components 124, 134. Plots 502 through 512 each consist of two linear slopes 502' through 512' and 502" through 512" giving rise to a triangular waveform shown pictorially in FIG. 5B, wherein the tooth pitch P is the sum of the linear slope $P_1$ and the linear slope $P_2$ where $P_1$ may not necessarily be symmetric to $P_2$.

Finite element simulation using the configuration of FIG. 3 yields analogous results of FIG. 5B for tooth pitch P for the second embodiment of the present invention, wherein the tooth pitch is the sum of $P_1$ and $P_2$ where $P_1$ may not necessarily be symmetric to $P_2$. The first and second embodiments of FIGS. 2 and 3, respectively, generate triangular waveforms as depicted in FIGS. 5A, 5B and 6 provided that, preferably, tooth widths 114 are, approximately, less than 40% of the tooth pitch P, wherein permanent magnet lengths 120, 220 are, approximately, 70% to 100% of the slot width 116.

As has been described, the first and second preferred embodiments of the present invention, depicted in FIGS. 2 and 3, respectively, generate magnetic sensor 100, 200 output signals of saw-tooth waveforms, depicted in FIGS. 4A and 4B, and triangular waveforms, depicted in FIGS. 5A, 5B, and 6, with suitable parametric choices for permanent magnet lengths 120, 220, tooth widths 114, and slot widths 116, wherein the sensor signal outputs have at least one linear range, for example $P_1$, upon the passage of at least one tooth and one slot, one tooth pitch P, of the target wheel 112 past the magnetic sensor, whereby linear interpolation of position is possible with appropriate signal processing algorithms by which increased position resolution can be provided.

Figure 7:
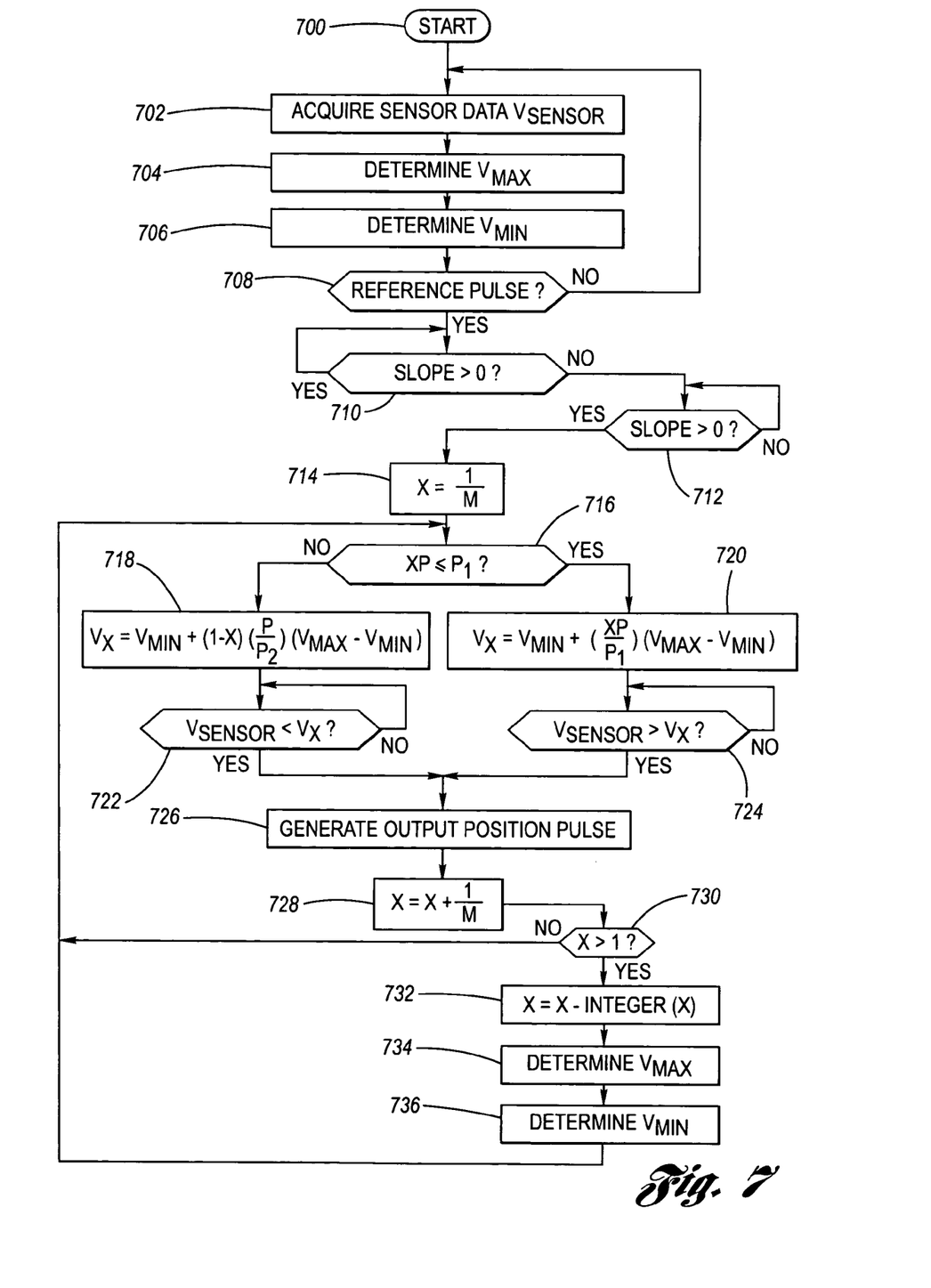
FIG. 7 is a flow chart of a first algorithm according to the first and second embodiments of the present invention.

FIG. 7 is a first flow chart of a first algorithm according to the first and second preferred embodiments of the present invention, whereby linear interpolation of position is possible with appropriate signal processing algorithms upon the passage of at least one tooth and one slot, one tooth pitch P, of the target wheel 112 past the magnetic sensor 100, 200 by which increased position resolution can be provided for saw-tooth waveforms and triangular waveforms. The triangular waveform is considered as a general case with the saw-tooth waveform corresponding to the case where slope $P_2$ is taken to be zero. Upon the generation of an externally supplied reference pulse, the first algorithm of FIG. 7 generates M number of position pulses per tooth pitch P each tooth pitch which are equally spaced between a maximum signal output voltage level and a minimum signal output voltage level by calculating M number of voltage levels, designated $V_X$ within the algorithm, by linear interpolation and triggering a position pulse whenever the signal output voltage level crosses each of the calculated voltage levels.

The first algorithm of FIG. 7 starts at Block 700 wherein the process is initialized with the tooth pitch P, slope $P_1$, slope $P_2$, number M, and any and all appropriate parameters necessary. The sensor 100, 200 output data is acquired as $V_{SENSOR}$ at Block 702 and the maximum and minimum voltage levels $V_{MAX}$ and $V_{MIN}$ (see FIG. 5B) of $V_{SENSOR}$ are determined at blocks 704 and 706. Block 708 checks for a reference pulse. If no reference pulse has been generated, control passes to Block 702. Else control passes to Block 710 where the slope of the sensor output voltage $V_{SENSOR}$ is inquired. If the slope is positive, control remains at Block 710 until the slope is negative at which time control passes to Block 712 where the slope of $V_{SENSOR}$ is inquired once again. If the slope is negative, control remains at Block 712 until the slope is positive at which time control passes to Block 714. Blocks 710 and 712 ensure that the process begins upon the start of $P_1$. At Block 714, a parameter X is initialized by being set equal to 1/M, and control then proceeds to Block 716.

At Block 716, the product of the parameter X and tooth pitch P is compared to slope $P_1$. If the product XP is less than or equal to slope $P_1$, control passes to Block 720 and indicates that the sensor output voltage $V_{SENSOR}$ is on slope $P_1$ (that is, within the range of $P_1$). For the saw-tooth waveform, control will always pass to Block 720 from Block 716 since slope $P_2$ is set to zero for a saw-tooth waveform. Block 720 calculates the value of $V_X$ and Block 724 tests whether $V_{SENSOR}$ is greater than or equal to $V_X$. If not, control remains at Block 724 until $V_{SENSOR}$ is greater than $V_X$ indicating that the sensor output voltage level has crossed a calculated voltage level on the slope $P_1$ and an output position pulse is generated at Block 726.

If the product XP is greater than slope $P_1$ at Block 716, control passes to Block 718 and indicates that the sensor output voltage $V_{SENSOR}$ is on slope $P_2$ (that is, within the range of $P_2$). Block 718 calculates the value of $V_X$ and Block 722 tests whether $V_{SENSOR}$ is less than or equal to $V_X$. If not, control remains at Block 724 until $V_{SENSOR}$ is less than $V_X$ indicating that the sensor output voltage level has crossed a calculated voltage level on the slope $P_2$ and an output position pulse is generated at Block 726.

At Block 728, the parameter X is set incremented by 1/M and control passes to Block 730. At Block 730, If X is not greater than one, control passes to Block 716 where the above-described procedure is repeated. Else if X is greater than one, then one tooth pitch has passed by the sensor 100, 200, M number of output position pulses have been generated, and another M number of output position pulses will be generated for the next tooth pitch P and control passes to Block 732. At Block 732, the parameter X is reset to the value 1/M and $V_{MAX}$ and $V_{MIN}$ from the previous tooth pitch P are determined at blocks 734 and 736, respectively, to be used in calculations during the next tooth pitch P which then begins when control passes from Block 736 to Block 716.

Figure 8:
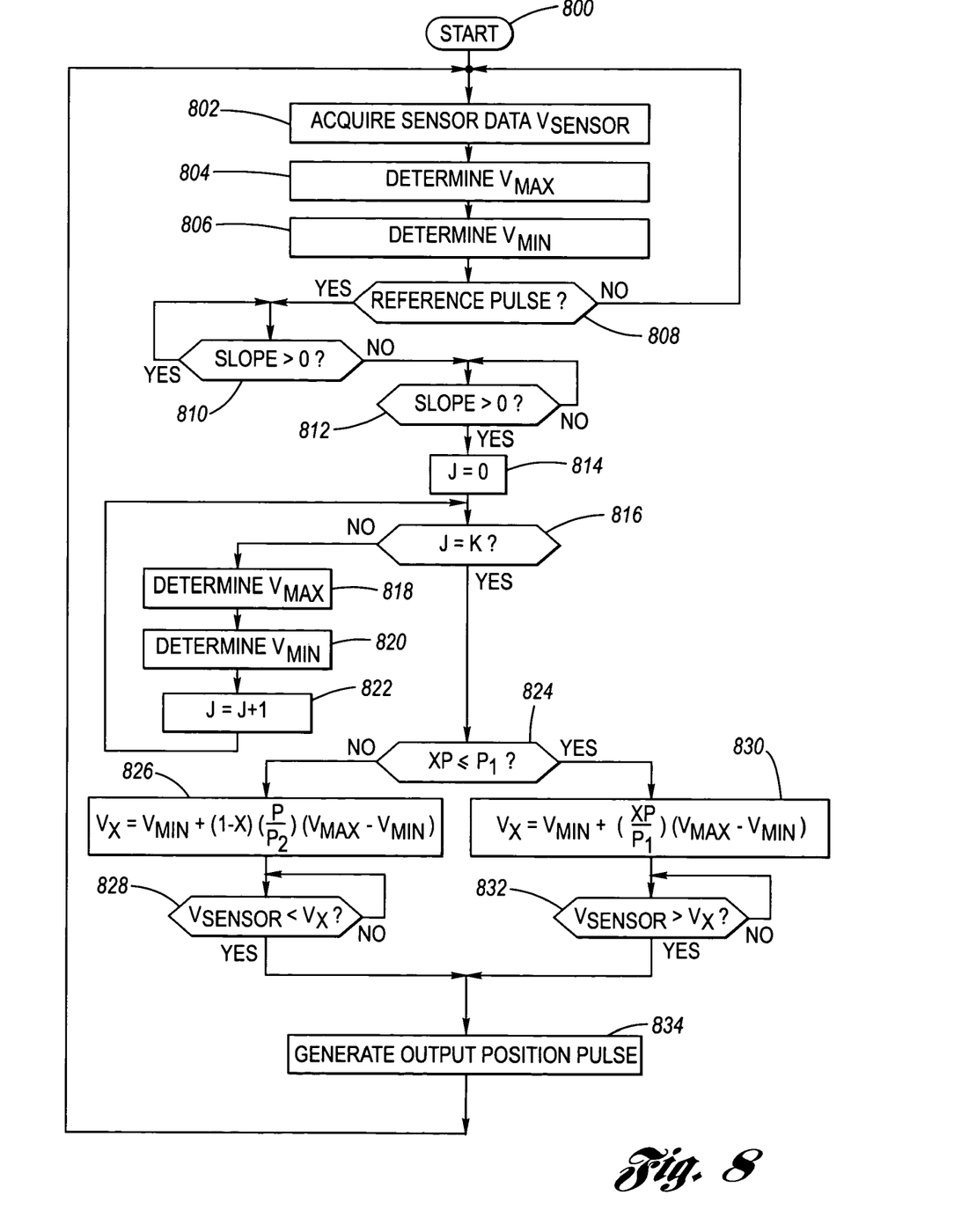
FIG. 8 is a flow chart of a second algorithm according to the first and second embodiments of the present invention.

FIG. 8 is a second flow chart of a second algorithm according to the first and second embodiments of the present invention, whereby linear interpolation of position is possible with appropriate signal processing algorithms upon the passage of at least one tooth and one slot, one tooth pitch P, of the target wheel 112 past the magnetic sensor 100, 200 by which increased position resolution can be provided for saw-tooth waveforms and triangular waveforms. The triangular waveform is considered as a general case with the saw-tooth waveform corresponding to the case where slope $P_2$ is taken to be zero. Upon the generation of a reference pulse, the second algorithm of FIG. 8 generates a position pulse corresponding to a predetermined position after the reference pulse is generated, wherein the predetermined position is a predetermined number K of tooth pitches P from the reference pulse plus a predetermined fraction X of the next (K+1) tooth pitch P. A voltage level $V_X$, calculated by linear interpolation, within the (K+1) tooth pitch P is determined and a position pulse is generated whenever the signal output voltage level crosses the calculated voltage level $V_X$.

The second algorithm of FIG. 8 starts at Block 800 wherein the process is initialized with the tooth pitch P, slope $P_1$, slope $P_2$, number K, fraction X, and any and all appropriate parameters necessary. The sensor 100, 200 output data is acquired as $V_{SENSOR}$ at Block 802 and the maximum and minimum voltage levels $V_{MAX}$ and $V_{MIN}$ (see FIG. 5B) of $V_{SENSOR}$ are determined at blocks 804 and 806. Block 808 checks for a reference pulse. If no reference pulse has been generated, control passes to Block 802. Else control passes to Block 810 where the slope of the sensor output voltage $V_{SENSOR}$ is inquired. If the slope is positive, control remains at Block 810 until the slope is negative at which time control passes to Block 812 where the slope of $V_{SENSOR}$ is inquired once again. If the slope is negative, control remains at Block 812 until the slope is positive at which time control passes to Block 814. Blocks 810 and 812 ensure that the process begins upon the start of slope $P_1$. At Block 814, a parameter J is initialized by being set to zero and control proceeds to Block 816. At Block 816 J is tested with K. If J does not equal K, then $V_{MAX}$ and $V_{MIN}$ are determined at Blocks 818 and 820, respectively, J is incremented by one at Block 822 indicating the passage of a tooth pitch P and control passes to Block 816. If J equals K at Block 816, control passes to Block 824.

At Block 824, the product of the parameter X and tooth pitch P is compared to slope $P_1$. If the product XP is less than or equal to slope $P_1$, control passes to Block 830 and indicates that the sensor output voltage $V_{SENSOR}$ is on slope $P_1$ (that is, within the range of $P_1$ for the (K+1) tooth pitch P). For the saw-tooth waveform, control will always pass to Block 830 from Block 824 since slope $P_2$ is set to zero for a saw-tooth waveform. Block 832 calculates the value of $V_X$ and Block 832 tests whether $V_{SENSOR}$ is greater than or equal to $V_X$. If not, control remains at Block 832 until $V_{SENSOR}$ is greater than $V_X$ indicating that the sensor output voltage level has crossed the calculated voltage level $V_X$ on the slope $P_1$ and an output position pulse is generated at Block 834.

If the product XP is greater than slope $P_1$ at Block 824, control passes to Block 826 and indicates that the sensor output voltage $V_{SENSOR}$ is on slope $P_2$ (that is, within the range of $P_2$). Block 826 calculates the value of $V_X$ and Block 828 tests whether $V_{SENSOR}$ is less than or equal to $V_X$. If not, control remains at Block 828 until $V_{SENSOR}$ is less than $V_X$ indicating that the sensor output voltage level has crossed the calculated voltage level $V_X$ on the slope $P_2$ and an output position pulse is generated at Block 834. Thereupon, control passes from Block 834 to Block 802 whereby the process is repeated for the next reference pulse.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A method for determining position of a target moving relative to a magnetic sensor, the target having magnetic irregularities defining a pitch, an output of the magnetic sensor being responsive to movement of the target relative thereto, a voltage level of the output having a range comprising, for each pitch, at least one linear slope, said method comprising the steps of:

determining a maximum voltage level of the output of the magnetic sensor;

determining a minimum voltage level of the output of the magnetic sensor;

calculating a preselected number of mutually spaced voltage levels, each said voltage level corresponding to a respective voltage level of the at least one linear slope; and generating a plurality of position pulses, each position pulse being generated when the voltage level of the output of the magnetic sensor has a predetermined relationship with respect to a respective calculated voltage level on the at least one linear slope.

2. The method of claim 1, wherein the at least one linear slope comprises a linear first slope and a linear second slope, wherein said step of generating a position pulse further comprises: a position pulse being generated if the voltage level of the output of the magnetic sensor is at least equal to a respective calculated voltage level on the linear first slope; and a position pulse being generated if the voltage level of the output of the magnetic sensor is at most equal to a respective calculated voltage level on the linear second slope.

3. The method of claim 2, further comprising detecting a reference pulse before said step of calculating.

4. The method of claim 3, further comprising, before said step of calculating and after said step of detecting, calculating a first calculated voltage level of the preselected number of voltage levels at a beginning of the first slope.

5. The method of claim 4, wherein said step of calculating further comprises determining which of said first and second slopes the output voltage of the sensor is to be compared to in said step of generating.

6. The method of claim 5, further comprising detecting a reference pulse before said step of calculating.

7. The method of claim 6, wherein said step of calculating comprises:

determining which of said first and second slopes the output voltage of the sensor is to be compared to in said step of generating.

8. A method for determining position of a target moving relative to a magnetic sensor, the target having magnetic irregularities defining a pitch, an output of the magnetic sensor being responsive to movement of the target relative thereto, a voltage level of the output having a range comprising, for each pitch, at least one linear slope, said method comprising the steps of:

determining a maximum voltage level of the output of the magnetic sensor;

determining a minimum voltage level of the output of the magnetic sensor;

determining a preset number of pitches;

calculating a voltage level when the preset number of pitches has occurred, wherein the voltage level corresponds to a respective voltage level of the at least one linear slope; and generating a position pulse when the voltage level of the output of the magnetic sensor has a predetermined relationship with respect to the calculated voltage level on the at least one linear slope.

9. The method of claim 8, wherein the at least one linear slope comprises a linear first slope and a linear second slope, wherein said step of generating a position pulse further comprises:

the position pulse being generated if the voltage level of the output of the magnetic sensor is at least equal to a respective calculated voltage level on the linear first slope; and the position pulse being generated if the voltage level of the output of the magnetic sensor is at most equal to a respective calculated voltage level on the linear second slope.

* * * * *